United States Patent Office 3,344,059
Patented Sept. 26, 1967

3,344,059
CONVERSION OF HYDROCARBONS TO GASOLINE WITH A ZUNYITE - CONTAINING CATALYST COMPOSITE
Gordon R. Engebretson, Park Forest, Ill., assignor to Sinclair Research, Inc., New York, N.Y., a corporation of Delaware
No Drawing. Filed Jan. 21, 1965, Ser. No. 427,109
6 Claims. (Cl. 208—120)

This invention concerns novel contact materials which are of special utility in the conversion of heavy petroleum fractions to lower boiling materials. The novel contact material is derived from the mineral zunyite and generally retains the essential crystalline structure of this mineral. In one embodiment, this invention provides a superior cracking catalyst which also may be used as a support for promoting metals such as platinum or nickel in a catalyst designed for paraffin isomerization or hydrocarbon hydrocracking or other hydrogenation processes. Zunyite has the formula $Al_{13}Si_5O_{20}(OH)_xF_yCl$ where $x$ and $y$ are integers totaling 18 and $y$ is at least 2.

The zunyite is mixed with amorphous materials comprising the oxides of elements of atomic number 12–14, usually silica-alumina or silica-magnesia, to form a catalyst according to this invention. In the finished catalyst or catalyst base, the zunyite generally will constitute about 1–80% of the finished catalyst preferably about 5–50%. The zunyite component will generally be used in a finely divided state achieved by precipitation or grinding. The mineral particles will often be no greater than about 10 microns.

An amorphous silica-alumina portion can be prepared by any conventional technique, such as by addition of sulfuric acid and aluminum sulfate solutions to a sodium silicate solution. The composition of the amorphous silica-alumina phase may be about 5–80% $Al_2O_3$, preferably about 10–50% $Al_2O_3$ with the remainder essentially $SiO_2$.

A silica-magnesia gel can be prepared by adding a magnesium sulfate solution to a silica dispersion. The dispersion will subsequently set to a hydrogel which can be treated with ammonium hydroxide solution, washed and dried to give the gel. A silica dispersion for this preparation is conveniently made by adding sodium silicate solution to a sulfuric acid solution. The composition of the silica-magnesia phase may be about 10–80% MgO, preferably about 15–35% MgO, with the remainder essentially $SiO_2$.

The amorphous phase and mineral phase are mixed at any time when intimate dispersion of the mineral phase in the amorphous phase can be achieved. Preferably, the phases will be mixed before the amorphous phase has been dried. The mineral may also be added during the precipitation of the amorphous phase. The finished contact material can be macrosize, for instance, in bead or tablet form or finely divided form, for use as a fixed, moving or fluidized bed. Often this invention will provide a finely divided (fluid) catalyst, for instance having particles predominantly in the 20 to 100 or 150 micron range to be disposed as a fluidized bed in the reaction zone to which a feed is charged continuously and reacted essentially in the vapor phase. If the contact material is to be used in a fixed bed operation it should be formed into particles in which the smallest linear dimension is about $\frac{1}{32}$ inch. This may be accomplished by any standard forming technique, for example extrusion or tabletting.

Catalytically promoted cracking of heavier hydrocarbon feedstocks to produce hydrocarbons of preferred octane rating boiling in the gasoline range is widely practiced and presently uses a variety of commercially available solid oxide catalysts to give end products of fairly uniform composition. Cracking is ordinarily effected to produce gasoline as the most valuable product and is generally conducted at temperatures of about 700 to 1100° F., preferably about 850 to 975° F., at pressures up to about 200 p.s.i.g., preferably about atmospheric to 5, 15 or even 100 p.s.i.g. and without substantial addition of free hydrogen to the system. In cracking, the feedstock is usually a mineral oil or petroleum hydrocarbon fraction such as straight run or recycle gas oil or other normally liquid hydrocarbon boiling above the gasoline range. The contact material of this invention is especially useful in cracking hydrocarbon feedstocks having an initial boiling point of about 500° F. or more. Such materials include reduced crudes and other residual stocks, asphalt, the product from butane and/or pentane deoiling of asphalt, etc. A batch, semi-continuous or continuous system may be used, but most often a continuous fluidized system is used. In such system, vaporous cracker effluent is taken overhead and a portion of the catalyst is continuously withdrawn and passed to a regeneration zone where coke or carbon is burned from the catalyst in a fluidized bed by contact with a free-oxygen-containing gas before its return to the reaction zone. In a typical operation the catalytic cracking of the hydrocarbon feed would normally result in the conversion of about 40 to 70%, preferably about 50 to 60%, of the feedstock into a product boiling in the gasoline range. The effluent from the cracker conveniently is distilled to isolate the gasoline fraction. Also, products, such as fixed gases, boiling below the gasoline range are removed from the system.

In cracking, coke yield may be held to a minimum through the use of good steam stripping and a high steam partial pressure, and removal of coke from the catalyst is performed by regeneration. Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about ½%. The regeneration of any particular quantum of catalyst is generally regulated to give a carbon content of less than about 5.0%, generally less than about 0.5%. Regeneration puts the catalyst in a substantially carbon-free state, that is, the state where little, if any, carbon is burned or oxygen consumed even when the catalyst is contacted with oxygen at temperatures conducive to combustion.

Hydrocracking is usually performed at a temperature higher than about 750° F. say a temperature in the range of about 750–900° F., preferably about 800–850° F., and a pressure in the range of about 100–10,000 p.s.i.g., preferably about 1000–2000 p.s.i.g. A space velocity of about 0.1 to 10 weight of oil feed per weight of catalyst may be employed. Preferably the WHSV is about 0.25–2.0. Hydrogen is provided from any convenient source and consumption can be in the range of about 2000 to 3000 cubic feet per barrel of charge. The effluent from the hydrogenolysis unit is generally separated by fractionation. In hydrocracking a batch, semi-continuous or continuous system may be used, but most often a continuous system is used.

The invention will be better understood by reference to the following examples, which should be considered illustrative only and not limiting.

A silica-alumina hydrogel is prepared by adding 865 ml. of sodium silicate solution (28.8 weight percent $SiO_2$, 40–41.5 Baumé at 68° F. and $Na_2O:SiO_2$ ratio of 1:3.2) to 4,275 ml. of water preheated to 90° F. After stirirng the batch for 5 minutes, 302 mls. of 34.5 weight percent sulfuric acid solution is added at 182° F. over a period of 45 minutes. A gel forms about 35 minutes after acid addition is begun. Then the pH is adjusted to 8.0–8.5 and the batch agitated for 10 minutes. 715 ml. of alum (7.8 weight percent as $Al_2O_3$) is added to the silica gel over a period of 36 minutes. After an additional 5 minutes agitation, 205 ml. of sodium aluminate solution (24.4 weight percent as $Al_2O_3$) diluted in 1080 ml. of water is added over a 17 minute period. After all the sodium aluminate is added the pH is about 5.0–5.2 and the alumina content of the silica-alumina hydrogel 30–31%.

125 grams of 8–20 mesh particle size zunyite is added to an 850 gram portion of the silica-alumina hydrogel and the batch is mixed in a Waring Blendor for 5 minutes. The mixture is held in a drying oven for 10 hours and the resulting granules washed with warm water until a negative sulfate test is obtained. The granules are dried and ground in a hammer mill to a powder that will pass a 200 mesh screen. Then the powder is calcined 3 hours at 1000° F. in air.

A comparison of the effects of catalytic cracking using this catalyst with the effects produced using a catalyst produced in the same manner but without addition of zunyite to the silica-alumina gel shows the novel catalyst of this invention to give a greater yield of material boiling in the gasoline range, and shows greater selectivity as evidenced by less coke on the catalyst and less hydrogen in the gaseous product.

It is claimed:
1. A solid contact material consisting essentially of zunyite with which is associated about 20–99% by weight of the contact material of a solid synthetic gel selected from the group consisting of 5–80% alumina, the balance essentially silica, and 10–80% magnesia, the balance essentially silica.

2. The contact material of claim 1 in which the synthetic gel is 10–50% alumina, the balance essentially silica.

3. The contact material of claim 1 wherein the contact material contains about 5–50% zunyite.

4. A method for the conversion of a hydrocarbon feedstock boiling above the gasoline range which comprises contacting said feedstock under cracking conditions with the contact material of claim 1 and recovering gasoline from said contacting.

5. A method for the conversion of a hydrocarbon feedstock boiling above the gasoline range which comprises contacting said feedstock under cracking conditions with the contact material of claim 2 and recovering gasoline from said contacting.

6. A method for the conversion of a hydrocarbon feedstock boiling above the gasoline range which comprises contacting said feedstock under cracking conditions with the contact material of claim 3 and recovering gasoline from said contacting.

References Cited

UNITED STATES PATENTS

| | | | |
|---|---|---|---|
| 3,140,249 | 7/1964 | Plank et al. | 208—120 |
| 3,140,251 | 7/1964 | Plank et al. | 208—120 |
| 3,140,253 | 7/1964 | Plank et al. | 208—120 |

OTHER REFERENCES

"Text Book of Mineralogy," Dana, 4th edition, pp. 590–591 (1932), John Wiley and Sons, New York.

DELBERT E. GANTZ, *Primary Examiner.*

A. RIMENS, *Assistant Examiner.*